Patented May 27, 1924.

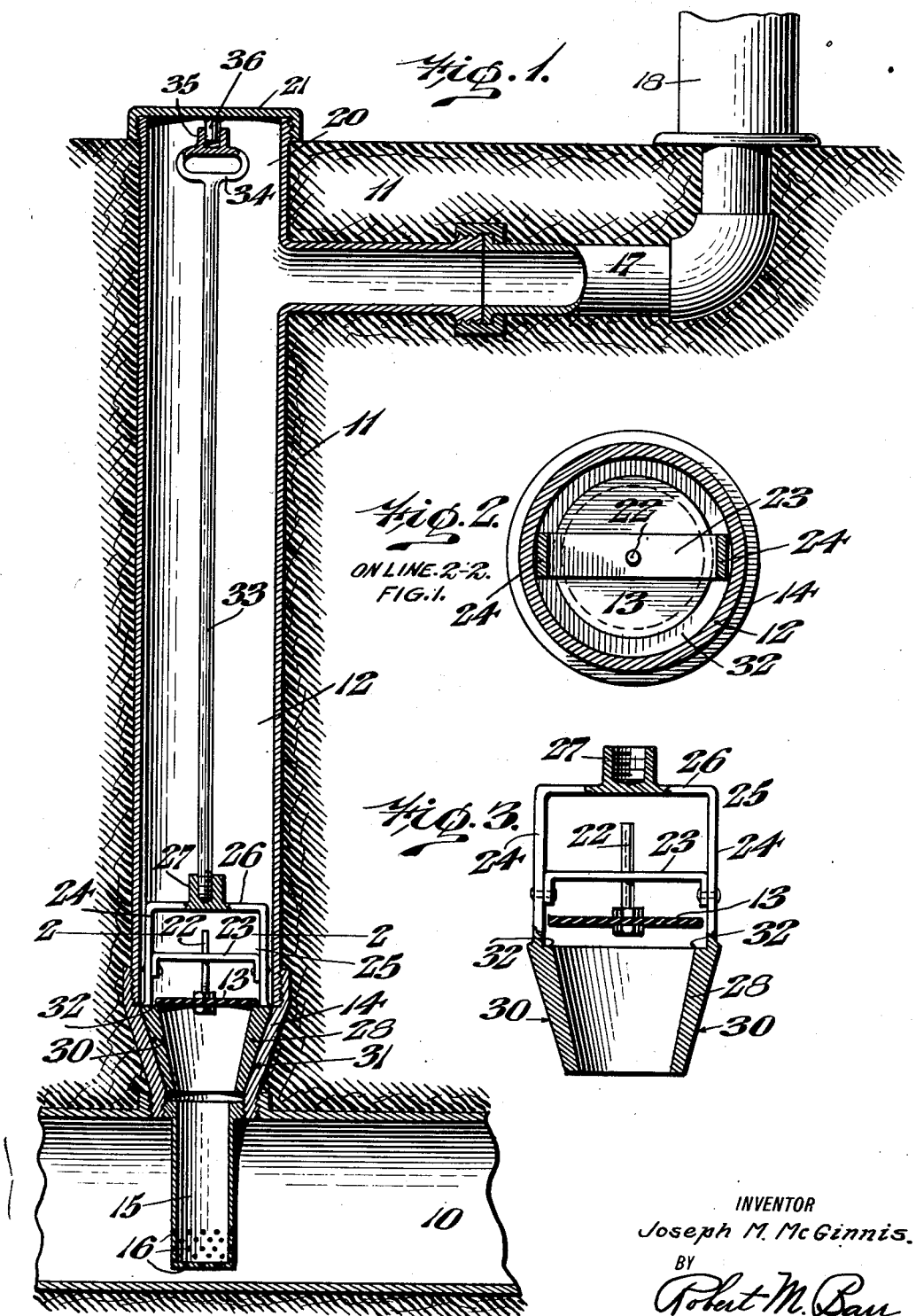

1,495,858

UNITED STATES PATENT OFFICE.

JOSEPH M. McGINNIS, OF PHILADELPHIA, PENNSYLVANIA.

VALVE MECHANISM.

Application filed January 26, 1923. Serial No. 614,986.

*To all whom it may concern:*

Be it known that I, JOSEPH M. MCGINNIS, a citizen of the United States, and a resident of Philadelphia, county of Philadelphia, State of Pennsylvania, have invented a certain new and useful Improvement in Valve Mechanism, of which the following is a specification.

Some of the objects of the present invention are to provide an improved valve structure for underground liquid storage tanks; to provide means whereby the check valve of an underground storage tank is accessible for repairs and replacement without requiring excavation; to provide a storage tank for liquids with a removable check valve and means operative from a distant point for removing the valve; to provide means for eliminating the expense and loss of time now required for gaining access to the check valves of tanks located below the level of the ground; and to provide other improvements as will hereinafter appear.

In the accompanying drawings, Fig. 1 represents a sectional elevation of an underground liquid storage tank showing one form of control valve embodying the present invention; Fig. 2 represents a section on line 2—2 of Fig. 1; and Fig. 3 represents an enlarged detail in part section of the valve parts.

Referring to the drawings, one form of the present invention is shown applied to a storage tank 10, such as employed as a reservoir for gasoline, or any other liquid, and which is located in the ground 11, and generally, as in the case of inflammable liquids some ten to twenty feet below the ground level.

For the purpose of removing the stored liquid, a discharge pipe 12 is provided, the lower end of which is arranged to communicate with the interior of the tank 10, and has a check valve 13 for control purposes. In the present construction the lower end of the discharge pipe 12 has threaded engagement with a downwardly tapered or converging foot-piece 14, which has its lower end threaded into the body of the tank 10 and in communication with an inlet section 15 extending into close proximity to the bottom of the tank 10 and provided with a screen 16 of usual form. As here shown the discharge pipe 12 has a laterally extending portion 17 which terminates in a pump unit 18, the details of which are not shown because it forms no part of the invention and any well known form of liquid removing means may be employed.

In order to render the check valve 13 accessible for repairs and replacement, the upper end of the discharge pipe 12 is provided with an extension 20, which is co-axial with the body of the pipe and terminates at or near the ground level where it is normally covered with a cap 21, or any other suitable cover means. The valve 13 is preferably of the leather check type mounted for sliding movement by attachment to a stem 22 which is guided in a strip 23 transversely and rigidly held between the opposite arms 24 of a bail or cage 25, the top member 26 of which has a threaded boss 27 formed thereon. The lower ends of the bail arms 25 are here shown as formed integral with a valve seat member 28 having the form of a tubular inverted frustum of a cone, the outer surface 30 of which conforms to the inner surface 31 of the foot-piece 14. These two surfaces 30 and 31 are ground to form a tight joint, and the parts normally fit in a leak proof manner.

The upper end of the member 28 is provided with a circumferential seat 32 to receive the valve 13 and shut off reverse flow of liquid in closed position of the valve.

As a means for withdrawing the valve structure, a rigid rod 33 is threaded at its lower end into the boss 27, while its upper end is provided with a handle 34 having a socket 35 formed thereon to receive a pin 36 which is preferably cast on the inner face of the cap 21. This interlocking construction serves to hold the rod 33 in a central position and prevent the weight of the parts from throwing the valve out of alinement.

In the storage of gasoline or other liquids of an inflammable nature regulations and ordinances generally require that the tanks, serving as reservoirs for such liquids, be buried in the ground at a depth consistent with safety, such depth varying from ten to eighteen or twenty feet below the level of the ground according to circumstances which are usually governed by the floor level of the cellar of the building to which the tank is adjacent. It frequently happens that the valve controlling the discharged liquid gets out of repair so that the pump either fails to deliver the required measured quantity or does not function at all, so that to make repairs it becomes necessary to dig down to the tank to gain access to the troublesome valve. The labor incident to this excavation and removal of material far exceed the usually small cost of repairing or replacing the valve. By the present invention this expense and loss of time have been entirely eliminated because the discharge pipe has been arranged so that it has an auxiliary opening at or near the ground level and covered by a cap or hand-hole cover which, when removed, allows the valve removing mechanism to be reached and the valve taken out for repair, regrinding, or replacement.

While in the foregoiong, reference has been made more particularly to gasoline storage tanks of the type used at automobile service or supply stations, it is to be understood that the invention is broadly applicable to any type of buried tank or device having a valve which may require attention.

While only a single form is shown in which this invention may be embodied, it is to be understood that the invention is not limited to any specific construction, but might be applied in various forms without departing from the spirit of the invention or the scope of the appended claims.

Having now fully described my invention, I claim:—

1. A tank construction comprising in combination an underground tank, a discharge pipe from said tank connected to a pumping unit, a check valve in said pipe opening towards the pipe discharge, and means for gaining access to said pipe from the ground level to remove said valve.

2. A tank construction comprising in combination an underground tank, a discharge pipe from said tank connected to a pumping unit, a valve seat removably mounted in said discharge pipe, a check valve opening towards said pipe discharge and arranged to cooperate with said seat and be removable therewith, means for removing said valve seat, and means for gaining access to said pipe from the ground level to operate said removing means.

3. A tank construction comprising in combination an underground tank, a discharge pipe from said tank connected to a pumping unit, a valve seat having a ground joint connection with said discharge pipe and freely removable therefrom, a check valve opening towards said pipe discharge and arranged to co-operate with said seat and removable therewith, means for removing said valve seat, and means for gaining access to said pipe from the ground level to operate said removing means.

4. A tank construction comprising in combination an underground tank, a discharge pipe having one end connected to said tank and its other end accessible from the ground level, a branch pipe from said discharge pipe connected to a pumping unit, a cap or cover for said discharge pipe, a check valve removably mounted in said discharge pipe, and means accessible by removing said cap for removing said check valve.

5. A tank construction comprising in combination an underground tank, a discharge pipe from said tank connected to a pumping unit, a downwardly tapered foot-piece on said pipe provided with an internal ground seat, a valve seat member shaped to conform to and form a joint with said ground seat, said member having a seat thereon, a check valve arranged to co-operate with said valve seat, a cage or bail secured to said valve seat member and forming a guide for said valve, means for gaining access to said discharge pipe from the ground level, and means for engaging said cage or bail to remove said valve member and valve.

Signed at Philadelphia, county of Philadelphia, State of Pennsylvania, this 23 day of January, 1923.

JOSEPH M. McGINNIS.